TWO-TONE TRANSMISSION SYSTEM FOR DIGITAL DATA

Filed Feb. 16, 1961 3 Sheets-Sheet 1

INVENTORS: E. R. KRETZMER
R. A. WINTER
BY: J. P. Kearns, Jr.
ATTORNEY

TWO-TONE TRANSMISSION SYSTEM FOR DIGITAL DATA

Filed Feb. 16, 1961 3 Sheets-Sheet 2

INVENTORS: E. R. KRETZMER
R. A. WINTER
BY: J. P. Kearns, Jr.
ATTORNEY

TWO-TONE TRANSMISSION SYSTEM FOR DIGITAL DATA

Filed Feb. 16, 1961

3 Sheets-Sheet 3

INVENTORS: E. R. KRETZMER
R. A. WINTER

BY: J. P. Kearns, Jr.

ATTORNEY

United States Patent Office
3,165,583
Patented Jan. 12, 1965

3,165,583

TWO-TONE TRANSMISSION SYSTEM FOR DIGITAL DATA

Ernest R. Kretzmer, New Providence, N.J., and Ralph A. Winter, Ridgefield, Conn., assignors to Bell Telephone Laboratories, Incorporated, New York, N.Y., a corporation of New York Filed Feb. 16, 1961, Ser. No. 89,831
7 Claims. (Cl. 178—66)

This invention relates to data transmission systems in general and more particularly to such a system applied to a voice frequency transmission line.

In a copending application of M. E. Alterman and E. A. Irland, Serial No. 13,649, filed March 8, 1960, now United States Patent No. 3,073,907 granted January 15, 1963, there is disclosed a line scanning circuit which may be associated with a plurality of telephone subscriber sets, or lines, remote from a central office. Use for such an arrangement can be found in a private branch exchange or in a line concentrator system, either of which may be part of an electronic telephone switching system. The line scanning circuit provides information relative to the binary address and condition of a line requiring service at the remote location for the central office common control equipment.

This invention together with line scanning equipment such as described in the above-mentioned application provides improved means for maintaining communication between the remote location and the central office by digital means. The problem is to transmit binary information over a voice frequency line using carrier frequencies comparable to the data rate, for example, transmitting 1000 bits per second on a 1000 or 2000 cycle per second carrier wave, and still be able to achieve error-free demodulation at the receiver.

Accordingly, it is an object of this invention to achieve one-way transmission of binary data over ordinary, voice frequency transmission facilities simply, economically and rapidly.

It is another object of this invention to transmit binary signals by frequency-shift carrier waves solely by digital means.

It is a further object of this invention to demodulate binary data signals by digital means without the use of tuned circuits.

It is yet another object of this invention to recover synchronizing information from the received signal in a simple fashion without resorting to flywheel circuits or the use of a local oscillator at the receiver.

According to this invention, a data transmitter accepts binary data serially and keys one of two harmonically related and synchronized square-wave signals to a voice-frequency transmission line, such as a telephone trunk, according to whether the data bit is a marking "one" or a spacing "zero" by digital means. Each data bit is thereby transmitted as an integral number of cycles of frequency-shifted carrier waves lying wholly in the pass band of the transmission medium.

In the receiver the two carrier frequencies are distinguished in the time domain rather than in the frequency domain by integrating over the half-period of each frequency in a circuit using a single time constant. "Zeros" and "ones" are delivered on separate leads. In addition, by the use of a frequency divider, a synchronizing signal is produced on a third lead.

In a further receiver embodiment a double discriminator circuit is employed to compare the information contained in the positive and negative half-cycles of the received wave. If, due to the presence of noise on the transmission, the two half-cycles do not agree, the received signal is rejected as spurious. Increased error protection is thereby achieved.

It is a feature of this invention that the choice between the marking and spacing frequencies is accomplished in a simple switch circuit.

It is a further feature of this invention that synchronizing information is obtained directly from the spacing frequency without the use of a separate timing frequency.

Additional objects, features and advantages of this invention will be realized from a consideration of the following detailed description together with the drawing in which.

Figures 1, 2, 3:
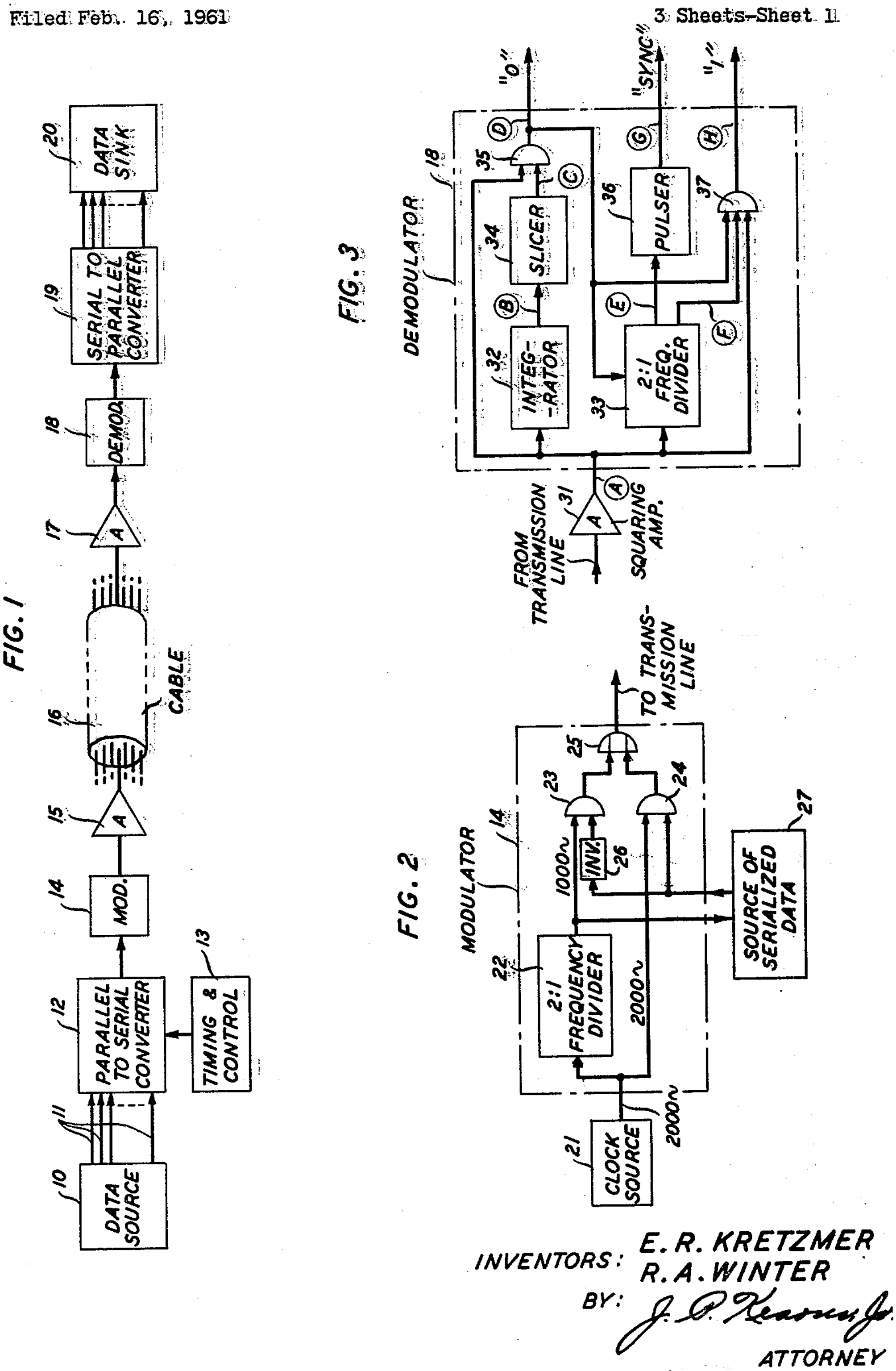
FIG. 1 is a block diagram of an overall transmission system to which this invention may be applied.
FIG. 2 is a block diagram of a modulator according to this invention which is useful at the transmitting end of a data transmission system.
FIG. 3 is a block diagram of one embodiment of a demodulator according to this invention which is useful at the receiving end of a data transmission system.

FIG. 1 is representative of a data transfer link useful in a transmission system using telephone cables as the transmission medium. Such a system may include at the transmitting end a data source 10 providing binary data on a plurality of parallel leads 11 to a parallel-to-serial converter 12. The latter device delivers serial data bits under the timing control of a circuit 13 to a modulator 14 for impressing a frequency-shift signal on a cable pair of a telephone cable 16 through a line amplifier 15. At the receiving end the frequency-shift signals are amplified and limited in an amplifier 17 and impressed on a frequency-discriminating demodulator 18. The serial bits recovered in the demodulator are reconverted to parallel form in serial-to-parallel converter 19 for delivery to data sink 20.

Data source 10 may be a line-scanning and selecting circuit as disclosed in the aforementioned Alterman et al. patent and converter 12 may be any type of shift register well known in the art. Timing and control circuit 13 may be any clock source operating at a frequency compatible with the timing requirements of a particular data transfer system. Similarly data sink 20 may be telephone central office common control equipment, and converter 19 may be another conventional shift register. This invention is directed particularly to modulators and demodulators useful in such a data transfer system. However, it will be understood that the use of the modulator and demodulators of this invention are applicable to many other information transfer systems such as a telephone line concentrator. The transmission medium also may be other than a telephone cable.

FIG. 2 is a more detailed block diagram of a frequency modulator or frequency-shift keying circuit according to this invention. The data desired to be transferred from data source 10 of FIG. 1 to data sink 20 is in binary form, that is, there is a marking voltage level to represent the presence of a "one" bit and a spacing voltage level to represent the absence of a "one" bit or a "zero" bit. The message to be transferred may conveniently be converted into a sequence of marking and spacing voltage levels for application to the modulator. Such a converter is represented in FIG. 2 as a source of serialized data 27. In the present description "zeros" are assumed to be at the +12-volt level and "ones" are assumed to be at ground reference level.

It has been common in the past to effect frequency-shift signaling by the use of sinusoidal carrier frequencies. It has been determined, however, that the use of square-wave carriers results in a considerable simplification of the transmitter circuitry because square-wave carriers are more readily handled by digital circuitry. Accordingly, square-wave carriers are chosen for use in the transmitter according to this invention. Since a binary message requires only two frequencies, one for marking and another for spacing, these frequencies are most conveniently chosen with an integral ratio therebetween, such as two to one. Then, in order to simplify the recovery of timing information, one of the frequencies is chosen equal to the transmission bit rate. The result is that each bit is transmitted as an integral number of cycles of the carrier frequencies and the proble of line transients occurring between bits is eliminated if the two frequencies are derived from a common clock source.

The specific embodiment envisaged for description herein is intended for use over existing voice-frequency transmission facilities which have a frequency pass band of the order of 500 to 3000 cycles per second. However, the nature of the normal facility is such that there is a substantial fall off in response at frequencies above 1000 cycles per second. Therefore, a basic transmisison rate of 1000 bits per second is assumed which, following the principles set forth above, requires one frequency to be 1000 cycles per second and the other to be 2000 cycles per second.

Accordingly, the embodiment of FIG. 2 includes a clock source 21 operating at 2000 cycles per second, the output of which is assumed to appear as a square wave. The modulator itself comprises a two-to-one frequency-divider 22, which produces a 1000 cycle-per-second square wave; a pair of coincidence or AND-gates 23 and 24; an inverter 26; and an output buffer or OR gate 25. The frequency-divider 22 may conveniently be a multivibrator of any well known type. The AND-gates 23 and 24 have two input points each. The 2000-cycle output of clock 21 is applied to one input of AND-gate 24 and also to frequency-divider 22. The output of divider 22 is applied to one input of AND-gate 23. The other input points of AND-gates 23 and 24 are connected to the source of serialized data 27. The operations of data source 27 may readily be synchronized by the output of frequency-divider 22, if desired. Since coincidence gates 23 and 24 require two like marking inputs (zero volts here) to produce a positive output and only one or the other of the gates can be enabled for marks and spaces, respectively, an inverter 26 is included in series with the signal input to AND-gate 23. The outputs of the AND-gates are applied to the output buffer gate 25, which connects to the transmission line, assumed here to be a telephone cable pair. A line amplifier may be used in series with the output, if necessary.

The modulator is such that the 1000- and 2000-cycle carrier waves are continuously available at the inputs of the respective AND-gates and they are switched to the line in the alternative in accordance with the presence of a "zero" or a "one" in the output of the data source. The 1000-cycle carrier is used for the "zero" bit and is transmitted continuously in the absence of a data message to maintain synchronism between transmitter and receiver. The 2000-cycle carrier represents the "one" bit. A detailed description of a practical circuit for implementing FIG. 2 is given below.

A demodulator according to this invention is shown in block diagram form in FIG. 3. In traversing a telephone cable the square-wave signal is greatly distorted because of the relatively narrow bandwidth. Therefore, the received signal incoming from the transmission line is first applied to a squaring amplifier 31 to facilitate digital operations on the received signal, since only the transitions between positive and negative going portions of the signal are of interest.

Figure 7:
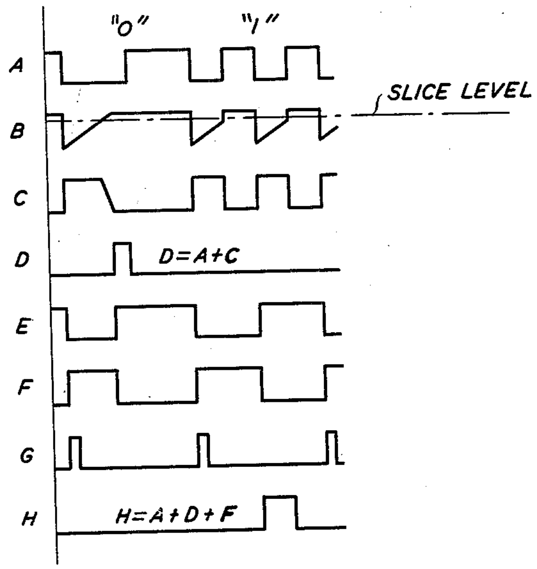
FIG. 7 is a waveform plot illustrating signals at different points in the demodulator embodiment shown in FIGS. 3 and 6.
Figure 6:
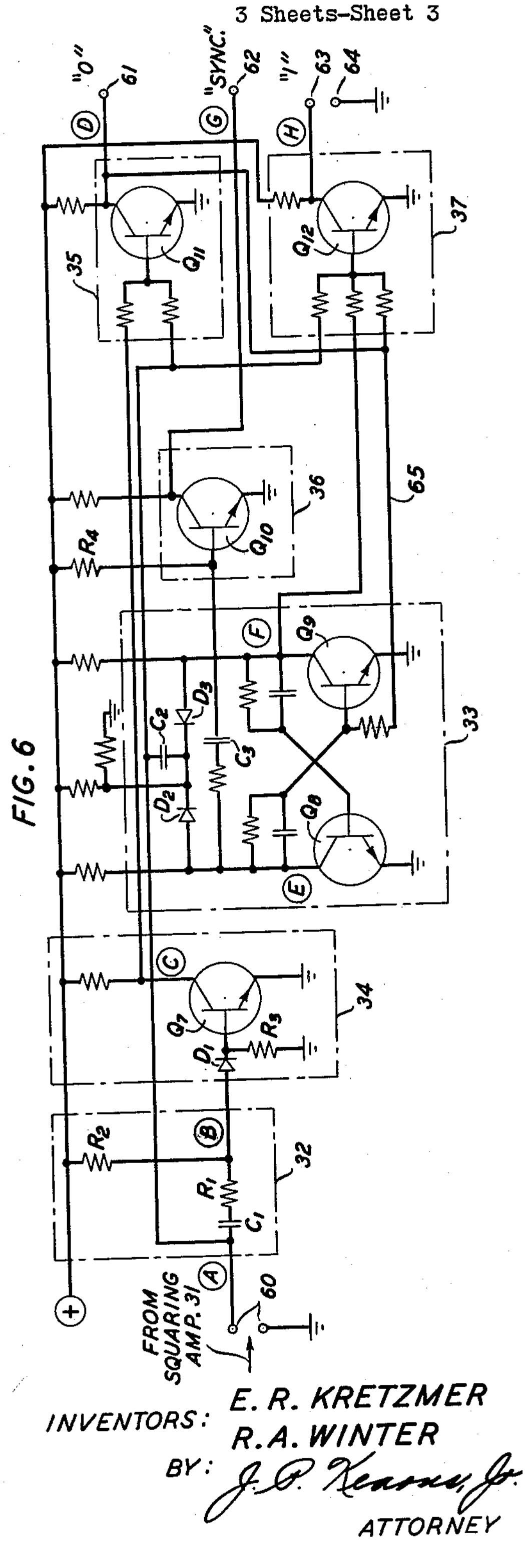
FIG. 6 is a circuit diagram of the one embodiment of a demodulator according to this invention.

FIG. 7 shows idealized waveforms encountered in the demodulator of FIGS. 3 and 6. The portion of the diagram or circuit at which a particular waveform appears is indicated by the appropriate encircled letter.

Waveform A (shown in FIG. 7) appears at the output of the squaring amplifier 31 as indicated. Waveform A illustrates a "zero" bit as being represented by one complete cycle of the lower 1000-cycle frequency and a "one" bit as being represented by two complete cycles of the higher 2000-cycle frequency. It is seen that there is no discontinuity in the waveform between a space and a mark. Since only one or two cycles of one frequency occur per data bit, it is impractical to discriminate between them on the basis of frequency. Therefore, the squared signal is fed to an integrator 32 having a time constant large with respect to the half-period of the higher frequency but comparable to the half-period of the lower frequency. Thus, in a half-cycle of the lower frequency the output of the integrator can return to its reference level, while in a half-cycle of the higher frequency it cannot so return. The output of a typical integrator for the assumed input signal A appears as shown in waveform B.

The output of the integrator is applied to a slicer 34 which eliminates all of the integrator output below a certain threshold level, as indicated on waveform B. The slicer includes an amplifier so that the output thereof resembles the waveform C. Only the "zero" frequency waveform is altered, the "one" frequency remaining essentially the same as it was in waveform A except for a polarity reversal.

The output of the squaring amplifier is also fed directly to the one input of a two-input coincidence gate 35. The other input of gate 35 accepts the sliced integrator output. At only one point in the sliced wave do both inputs exhibit negative-going polarities at the same instant, and at this point a pulse appears at the output of gate 35 to represent the detected "zero" bit as shown in waveform D. All cycles of the "one" frequency appear in opposite phase at the input of gate 35 and produce no effective output on the "0" lead.

In order to recover the "one" bits a two-to-one frequency-divider 33 and a further three-input coincidence gate 37 are provided. These elements are so arranged that the square-wave output signal from amplifier 31 is applied to one input of gate 37 and to the set input of frequency-divider 33. The frequency divider produces oppositely poled outputs represented by waveforms E and F. A reset input to the frequency divider is provided from the output of gate 35 to reset the divider and thereby prevent it from dividing down from the "zero" frequency. Thus the output of the frequency divider is basically always at the lower ("zero") frequency, which also is the timing rate. The other two inputs of the gate 37 are provided from the "F" output of divider 33 and the "zero" output of gate 35. The positive-going output of gate 37 is therefore the detected "one" signal bit, as shown in waveform H, and appears on the "1" lead.

There remains only to recover the timing information and this is readily done by using the other output (E) of the frequency divider to control a monopulser 36, which delivers an output of the desired width on every negative-going transition of the E waveform to produce waveform G. This output is designated "SYNC" in FIG. 3.

It should be pointed out that the receiver of FIG. 3 operates as well with the polarity of the input signal reversed from that shown in waveform A. However, it can be demonstrated that the polarity shown is to be preferred, because otherwise the recovered SYNC signals are not evenly spaced and the "one" and "zero" outputs occur at the end of the bit interval rather than at the center.

Figure 4:
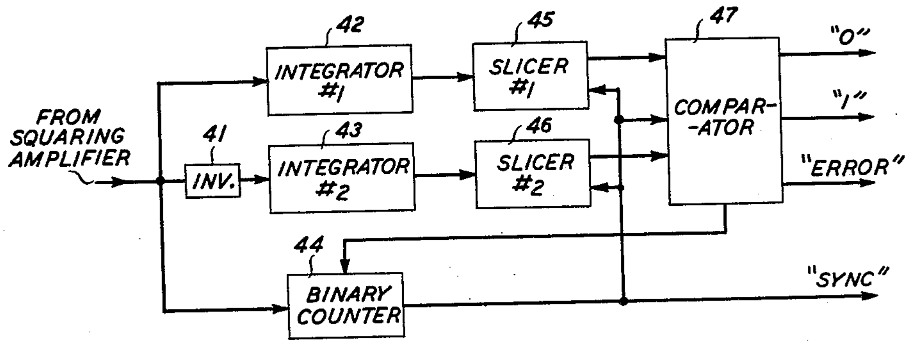
FIG. 4 is a block diagram of a further embodiment of a demodulator according to this invention which offers increased error protection.

FIG. 4 represents an extension of the principles employed in the demodulator of FIG. 3 which compares the information content of successive half-cycles of the received signal in a way which gives a measure of protection against errors arising from noise on the transmission facility. Two integrator-slicer circuits are used, one for each signal polarity. The integrated signals are compared at the end of each bit interval and upon failure of agreement between the two signals, the bit is rejected. The arrangement comprises a first integrator 42, a first slicer 45, a second integrator 43, a second slicer 46, an inverter 41, and a comparator 47. The first integrator receives the direct output of the squaring amplifier and consequently operates in exactly the same manner as the integrator 32 of FIG. 3. The output of the squaring amplifier is inverted in inverter 41 and applied to integrator 43 which performs the same operation on the other half-cycles of the received signal. The two outputs of the integrators are sliced as described for the arrangement of FIG. 3. However, each slicer includes some storage element such as a flip-flop circuit to store the signal until the end of the bit interval. At this time the two slicer outputs are applied to comparator 47, which may be a half-adder well known in the art. If both inputs agree an appropriate pulse appears on either the "1" or "0" lead. If the inputs fail to agree, then an output appears on the "ERROR" lead.

Timing information is recovered in binary counter stage 44, which may be similar to the frequency-divider of FIG. 3. Its input is obtained directly from the received signal and divides the higher frequency by two to obtain bit synchronization. An output from the comparator effects a separate control to prevent counting down from the lower, that is, "zero," carrier frequency. The output of the binary counter resets the slicer flip-flops at the end of each bit interval so that a comparison is freshly made in each bit interval.

Figure 5:
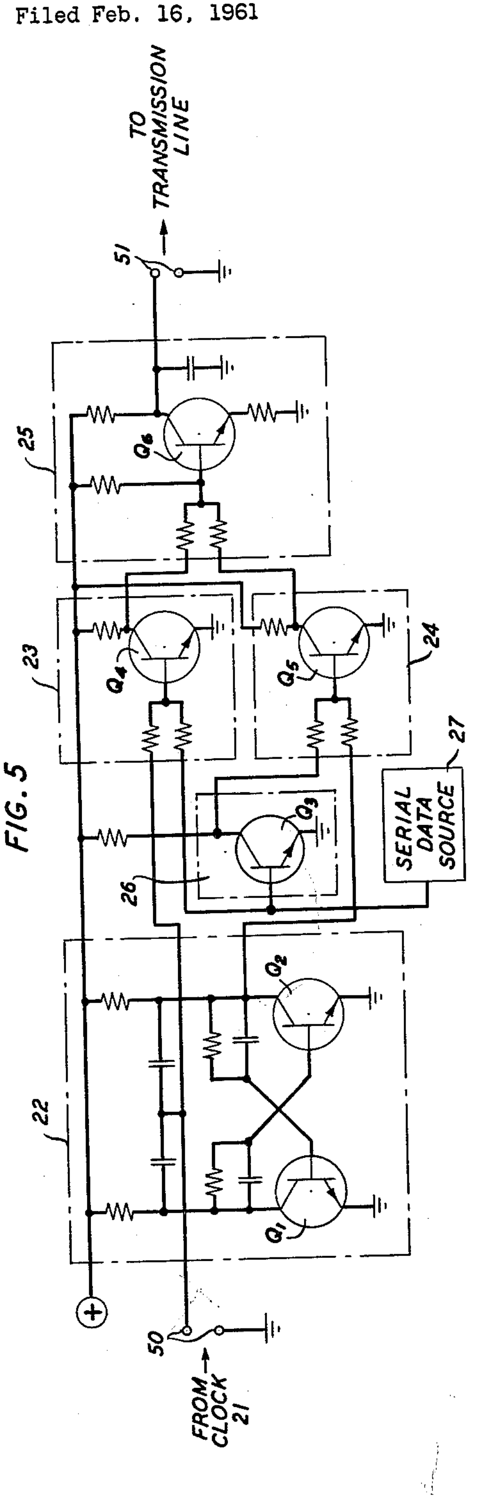
FIG. 5 is a circuit diagram of a modulator according to this invention.

A practical circuit for implementing the modulator diagrammed in FIG. 2 is shown in detail in FIG. 5. The portions of the circuit in FIG. 5 which implement the blocks in FIG. 2 are enclosed in dashed lines and numbered correspondingly.

Frequency-divider 22 is a conventional transistor multivibrator having two stable states of equilibrium. Collector and base electrodes of the two transistors $Q_1$ and $Q_2$ are cross-coupled as shown by means of parallel resistor-capacitor elements. Emitter electrodes are grounded and a source of positive potential is connected through resistors to the respective collector electrodes. The 2000-cycle square-wave from a clock source 21 is applied by way of input terminals 50 and the capacitors shown to the base and collector electrodes of each transistor.

As is well known, a bistable multivibrator is in a state of equilibrium when one of its active elements is in a state of appreciable current saturation and the other is in a cut-off state. When properly triggered the saturated element is sharply cut off and by a regenerative action due to the cross-coupling between output and input electrodes the other element is rapidly driven toward saturation. Since n-p-n transistors are shown in FIG. 5, each negative transition of the clock wave causes a reversal of state of the multivibrator. The output of the multivibrator is taken from the collector electrode of the right-hand transistor and comprises a square-wave at half the clock frequency.

Blocks 23 and 24 represent transistor-resistor coincidence or AND gates. An n-p-n transistor with emitter grounded and collector returned to a source of positive potential is used in each gate circuit. Transistor $Q_4$ is used in gate 23 and $Q_5$ in gate 24. Two direct-coupled inputs are applied through isolating resistors to the base electrodes. If either input is above ground the transistor is turned on, and the output at the collector is essentially at ground potential. However, when both inputs are at ground, the transistor is cut off and the voltage at the collector becomes positive.

Block 26 is a straightforward inverter. The emitter of the transistor $Q_3$ is grounded and the collector is returned through a resistor to a source of positive potential. The result is that ground on the base electrode cuts off the transistor and allows the collector voltage to rise to the level of the potential source. A positive input on the base conversely saturates the transistor and the collector voltage falls to ground reference level.

The serial data source 27 supplies a positive signal for "zero" spacing bits and ground for "one" marking bits. Therefore, its output is connected directly to one input of gate 23, which has its other input connected to input terminal 50, and to the input of inverter 26. The output of the inverter connects to one input of gate 24, which has its other input connected to the output of frequency-divider 22. Thus, when a "one" occurs at the data source, gate 23 is enabled and its collector voltage alternates between a positive voltage and ground at the clock frequency. At the same time the output of the inverter is positive and gate 24 is inhibited. Conversely, when a "zero" appears at the data source, gate 23 is blocked and gate 24 is enabled through inverter 26, thus allowing its collector voltage to follow the output of the multivibrator.

The final block 25 is a transistor OR-gate, the base electrode of which is returned to the positive potential source to bias it to the correct operating point with the aid of the emitter resistor shown. The outputs of both AND-gates are coupled to the base electrode by isolating resistors. Because of the bias on the base electrode and the resistor in the emitter circuit the transistor cannot be cut off or saturated, but rather responds to either input as a linear inverting amplifier and thus maintains a substantially constant output impedance suitable for driving a transmission line. The output is taken from the collector electrode and constitutes a square-wave at either marking or spacing frequency depending on the condition of data source 27. The capacitor connected from collector to ground helps further to eliminate sharp transients in the square-wave output. Output terminals 51 connect to the telephone transmission line. A low pass filter may be used to aid in matching the output to the pass band of the transmission line.

FIG. 5 represents one possible practical embodiment of the invention and is not intended to be limitative of the scope of the invention. Other implementations may be devised by those skilled in the art in accordance with the principles of this invention.

FIG. 6 is a practical embodiment of the demodulator of FIG. 3 using transistors as active elements. Each section of the circuit is enclosed in a dashed-line box and numbered to correspond to the appropriate block in FIG. 3. The waveforms of FIG. 7 are also keyed to FIG. 6 by the encircled letters.

Input terminals 60 receive the output of a squaring amplifier such as described in connection with the explanation of FIG. 3. Integrator 32 is seen to comprise a capacitor $C_1$ and two resistors $R_1$ and $R_2$ in series. Capacitor $C_1$ is connected to one of the input terminals 60 and the resistor $R_2$ is returned to a source of positive potential as designated by the encircled plus sign, thus effectively providing a current source. The positive potential may be of the order of 12 volts. The capacitor and resistors are chosen to have an RC time constant about equal to the half-period of the "zero" frequency, here assumed to be 1000 cycles per second. 600 microseconds is a suitable time constant for the circuit shown. The junction of resistors $R_1$ and $R_2$ is connected to ground through a diode $D_1$ and a further resistor $R_3$. The current flowing through resistor $R_2$ into diode $D_1$ and resistor $R_3$ and the base-emitter junction of transistor $Q_7$ establishes a clamping level for the integrator at somewhat more than one volt above ground. The clamping level on waveform B in FIG. 7 is just above the dot-dash line marked "slice level." It is seen that capacitor $C_1$ can charge on negative half-cycles of the input signals only.

Block 34 is a slicer amplifier having a transistor $Q_7$ with grounded emitter. The integrator output is applied to the base of the transistor through diode $D_1$, which is present to prevent excessive negative back bias on the transistor base. A slicing level is established slightly below the clamping level by the inherent characteristic of solid state diodes and transistors that requires a finite amount of forward drive before conduction begins. This is of the order of six-tenths of a volt for a silicon junction as found in transistor $Q_7$. The time constant of the integrator is such that only during negative half-cycles of the "zero" frequency does the sawtooth wave at the output of the integrator reach the slicing level. The portion of waveform B lying between the slice level and the clamping lever is amplified by transistor $Q_7$ to produce an output on its collector electrode as shown in waveform C.

Blocks 35 and 37 are transistor resistor logical-AND or coincidence gates using transistors $Q_{11}$ and $Q_{12}$ and are substantially identical to coincidence gates 23 and 24 shown in FIG. 5.

The input square-wave and the output of slicer 34 are combined in gate 35 as shown to produce the "zero" output at terminal 61 as shown in waveform D.

Frequency-divider 33 includes transistors $Q_8$ and $Q_9$ connected in a bistable circuit essentially the same as bistable circuit 22 in FIG. 5 except the steering diodes $D_2$ and $D_3$ are connected in series with the setting input from terminal 60. The diodes are clamped to a voltage divider across the supply voltage source to establish an operating threshold. Oppositely poled outputs are obtained on the respective collector electrodes as shown by waveforms E and F. A resetting input over lead 65 from terminal 61 is coupled to the base of transistor $Q_9$ to prevent frequency division of the "zero" frequency. The output of transistor $Q_9$ (waveform F), the input signal from terminal 60 (waveform A) and the "zero" output at terminal 61 (waveform D) are combined in three-input AND-gate 37 including transistor $Q_{12}$ to produce the "one" output pulse on terminal 63 as shown in waveform H.

The frequency divider output on the collector of transistor $Q_8$ (waveform E) drives pulser 36 through a differentiator circuit comprising capacitor $C_3$ and resistor $R_4$. The time constant of the resistor-capacitor combination is chosen to produce a five-microsecond pulse output at the collector of transistor $Q_{10}$, which is connected to output terminal 62 designated "SYNC." Waveform G appears on this terminal.

The two-integrator demodulator arrangement shown in FIG. 4 may be implemented by those skilled in the art in a fashion similar to that described in connection with FIG. 6.

While the information transfer system of this invention has been disclosed by the use of specific embodiments, its principles may readily be utilized in other circuit arrangements without departing from the spirit and scope of the appended claims.

What is claimed is:

1. A two-state frequency shift data transmission system comprising a transmission line, a source of binary data, a stable source of rectangular-wave oscillations at a first frequency within the pass band of said transmission line, means for deriving from the output of said stable source an even subharmonic frequency of said first frequency, a pair of two-input coincidence gates, one input of one of said gates being connected directly to said stable source, one input of the other of said gates being connected to said deriving means and the remaining inputs being connected to said data source, means inverting the binary data from said data source connected in series with a remaining input of one of said coincidence gates, and a buffer gate coupling the outputs of said coincidence gates to said transmission line.

2. An information transfer system comprising a voice frequency transmission path; a source of binary coded information signals occurring at fixed time intervals; a source of first square-wave signals having a fundamental frequency lying in the voice frequency band; means for deriving from said last-mentioned source second square-wave signals at a frequency equal to half the frequency of said first square-wave signals; means responsive to the binary coded signals from said information source keying to one end of said transmission path said first signals as a spacing signal and said second signals as a marking signal, said keying means comprising a pair of two-input coincidence gates, an input of one of said coincidence gates being coupled to said source of first square-wave signals and an input of the other of said coincidence gates being coupled to said deriving means to be activated by said second square-wave signals, a polarity inverter connected in series with the other input of the other of said coincidence gates, and means coupling said information signal source directly to the other input of said one coincidence gate and to the other input of the other coincidence gate through said polarity inverter; and means connected to the other end of said transmission path detecting said first and second signals.

3. An information transfer system according to claim 2 in which said detecting means comprises an input point connected to the other end of said transmission path, means for applying the first and second signals incoming on said transmission path to said input point, an integrator coupled to said input point for separating said first signal from said second signal, a slicing circuit for limiting the output of said integrator to an amplitude portion lying above a predetermined threshold level, a first coincidence gate for combining the signal at said input point and an output of said slicing circuit to form an output representing spacing code pulses, a frequency divider coupled to said input point for converting the frequency of said second signal to that of said first signal, a reset input of said frequency divider being connected to the output of said first coincidence gate so that only said second signal is frequency divided, a second coincidence gate for combining the first and second signals at said input point, the spacing-code pulses from said first coincidence gate and the frequency-divided output of said frequency divider to form an output representing marking code pulses, and pulsing means for forming a synchronizing signal under the control of an output of said frequency divider.

4. An information transfer system according to claim 2 in which said detecting means comprises an input point connected to the other end of said transmission path, means for applying the first and second signals incoming on said transmission path to said input point, a first integrator coupled to said input point for operating on one polarity only of each of the first and second signals, a first slicing circuit for limiting an output of said first integrator to an amplitude portion lying above a predetermined threshold level, said first slicing circuit also including storage means, an inverter coupled to said input point for reversing the polarity of the input signals, a second integrator circuit for operating on one polarity of an output of said inverter, a second slicing circuit for limiting an output of said second integrator to an amplitude portion lying above another predetermined threshold level, said second slicing circuit also including storage means, a comparator circuit for matching outputs of said first and second slicing circuits, said comparator circuit producing an error signal on a failure of the outputs of said first and second slicing circuits to agree, and a binary countdown circuit coupled to said input point for producing a timing signal at half the frequency of said second signal, the output of said countdown circuit controlling the release of the signals stored in said first and second slicing circuits to said comparator at the end of each signal interval.

5. An information transfer system according to claim 2 in which said detecting means comprises an input point connected to the other end of said transmission path, means for applying the first and second signals received over said transmission path to said input point, a pair of integrators coupled to said input point for separating the first signal from said second signal, a polarity inverter in series with one of said integrators, a pair of slicing circuits one being connected in series with the output of each of said integrators, a comparator coupled to outputs of said slicing circuits for determining agreement therebetween, and means controlled by said comparator for indicating an error when outputs of said slicing circuits fail to agree.

6. A receiver for binary data encoded on a wave including two harmonically related frequencies comprising squaring means, means for applying the received wave to said squaring means, an integrating network coupled to an output of said squaring means and having a time constant comparable to the period of the lower of said two harmonically related frequencies for discriminating therebetween, means coupled to said integrating network limiting an output thereof to a narrow slice, first means for combining outputs of said limiting and said squaring means to obtain a pulse output corresponding to one type of binary data element only, frequency dividing means for converting the higher of said two frequencies from an output of said squaring means to the lower of said two frequencies, a resetting input for said frequency-dividing means actuated by said first combining means to prevent the lower of said frequencies from being divided, and second means for combining outputs of said squaring, frequency-dividing and first combining means to obtain a further pulse output corresponding to the other type of binary data element.

7. A data transmission system comprising a voice frequency transmission line, a source of sequential binary coded data producing distinctive marking and spacing signals, a source of two synchronized harmonically related rectangular-wave signals having fundamental frequencies lying in the voice band, means keying the lower-frequency wave of said two rectangular-wave signals to said transmission line as a spacing frequency responsive to spacing signals from said data source, further means keying the other of said two rectangular-wave signals to the transmission line as a marking frequency responsive to marking signals from said data source, and single time-constant means at the other end of said transmission line intergrating over the half-period of the lower frequency of said two rectangular-wave signals to distinguish between the transmitted marking and spacing frequencies.

References Cited in the file of this patent

UNITED STATES PATENTS

| | | |
|---|---|---|
| 2,352,918 | Smith | July 4, 1944 |
| 2,482,561 | Shenk | Sept. 20, 1949 |
| 3,059,188 | Voelcker | Oct. 16, 1962 |